(12) United States Patent
Lee et al.

(10) Patent No.: US 11,651,472 B2
(45) Date of Patent: May 16, 2023

(54) METHOD FOR PROCESSING IMMERSIVE VIDEO AND METHOD FOR PRODUCING IMMERSIVE VIDEO

(71) Applicants: ELECTRONICS AND TELECOMMUNICATIONS RESEARCH INSTITUTE, Daejeon (KR); Poznan University of Technology, Poznan (PL)

(72) Inventors: Gwang Soon Lee, Daejeon (KR); Jun Young Jeong, Daejeon (KR); Dawid Mieloch, Poznan (PL); Adrian Dziembowski, Poznan (PL); Marek Domanski, Poznan (PL)

(73) Assignees: ELECTRONICS AND TELECOMMUNICATIONS RESEARCH INSTITUTE, Daejeon (KR); POZNAN UNIVERSITY OF TECHNOLOGY, Poznan (PL)

( * ) Notice: Subject to any disclaimer, the term of this patent is extended or adjusted under 35 U.S.C. 154(b) by 0 days.

(21) Appl. No.: 17/503,940

(22) Filed: Oct. 18, 2021

(65) Prior Publication Data

US 2022/0122217 A1   Apr. 21, 2022

(30) Foreign Application Priority Data

Oct. 16, 2020 (KR) .................. 10-2020-0134582
Oct. 7, 2021  (KR) .................. 10-2021-0133273

(51) Int. Cl.
*G06T 3/00*    (2006.01)
*H04N 19/46*   (2014.01)
*G06T 9/00*    (2006.01)
*H04N 19/44*   (2014.01)

(52) U.S. Cl.
CPC .............. *G06T 3/0087* (2013.01); *G06T 9/00* (2013.01); *H04N 19/44* (2014.11); *H04N 19/46* (2014.11)

(58) Field of Classification Search
CPC ......... G06T 3/0087; G06T 9/00; G06T 9/001; H04N 19/44; H04N 19/46; H04N 19/597
See application file for complete search history.

(56) References Cited

U.S. PATENT DOCUMENTS

| 2012/0122062 | A1  | 5/2012  | Yang et al. |
| 2015/0317057 | A1  | 11/2015 | Choi et al. |
| 2015/0334276 | A1* | 11/2015 | Ecker .................... G06T 3/4038 348/76 |
| 2019/0197739 | A1* | 6/2019  | Sinharoy ................ G06V 20/40 |

(Continued)

FOREIGN PATENT DOCUMENTS

| KR | 10-2045538 B1 | 11/2019 |
| KR | 10-2020-0097307 A | 8/2020 |
| WO | WO-2021001193 A1 * | 1/2021 |

OTHER PUBLICATIONS

"Committee Draft of Immersive Video", Approved WG 11 document, ISO/IEC JTC 1/SC 29/WG 11 N19482, Jul. 3, 2020.

*Primary Examiner* — Francis Geroleo
(74) *Attorney, Agent, or Firm* — LRK Patent Law Firm

(57) ABSTRACT

A method for processing an immersive video includes: performing pruning for view images; generating an atlas by packing a patch that is extracted as a result of the pruning; deriving an offset for the patch that is comprised in the atlas; and correcting pixel values in the patch by using the derived offset.

8 Claims, 8 Drawing Sheets

(56) References Cited

U.S. PATENT DOCUMENTS

| | | | |
|---|---|---|---|
| 2020/0221125 A1* | 7/2020 | Budagavi | H04N 19/146 |
| 2020/0351484 A1* | 11/2020 | Aflaki | H04N 19/597 |
| 2021/0258590 A1* | 8/2021 | Boyce | H04N 19/182 |

* cited by examiner (a)  (b)

(a) (b)

(a)

(b)

(a)

(b)

METHOD FOR PROCESSING IMMERSIVE VIDEO AND METHOD FOR PRODUCING IMMERSIVE VIDEO

CROSS-REFERENCE TO RELATED APPLICATIONS

The present application claims priority to Korean Patent Application No. 10-2020-0134582, filed Oct. 16, 2020, and Korean Patent Application No. 10-2021-0133273, filed Oct. 7, 2021, the entire contents of which are incorporated herein for all purposes by this reference.

BACKGROUND OF THE INVENTION

1. Field of the Invention

The present disclosure relates to a processing/outputting method for an immersive video supporting motion parallax for rotational and translation motions.

2. Description of Related Art

A virtual reality service is evolving in a direction for providing a service with a maximized sense of immersion and realism by generating an omnidirectional video in the form of a real image or computer graphics (CG) and reproducing the video on a head mounted display (HMD), a smartphone, etc. Currently, in order to reproduce a natural and immersive omnidirectional video through a HMD, six degrees of freedom (DoF) need to be supported. For a 6DoF image, a video free in six directions such as (1) left and right rotation, (2) up and down rotation, (3) left and right movement and (4) up and down movement needs to be provided through a HMD screen. However, currently, most omnidirectional videos based on real images support only rotation. Therefore, research into acquisition and presentation of 6DoF omnidirectional videos is actively being conducted.

SUMMARY

An object of the present disclosure is to provide a method for correcting uniformly a distribution of pixel values of patches in an atlas.

An object of the present disclosure is to provide a method for encoding/decoding information on correction of pixel values by using metadata.

The technical problems solved by the present disclosure are not limited to the above technical problems and other technical problems which are not described herein will become apparent to those skilled in the art from the following description.

A method for processing an immersive video according to the present disclosure comprises performing pruning for view images; generating an atlas by packing a patch that is extracted as a result of the pruning; deriving an offset for the patch that is comprised in the atlas; and correcting pixel values in the patch by using the derived offset.

The method for processing the immersive video according to the present disclosure, wherein the offset is derived as a difference value between a median value among pixel values, which are expressible by a bit depth, and an average value of pixel values in the patch.

The method for processing the immersive video according to the present disclosure, wherein, when a value, which is obtained by adding or subtracting the offset to or from a maximum value of the pixel values in the patch, exceeds a maximum value among pixel values expressible by the bit depth, the offset is adjusted to a difference value between a maximum value among the pixel values expressible by the bit depth and a maximum value of the pixel values in the patch.

The method for processing the immersive video according to the present disclosure, wherein, when a value, which is obtained by adding or subtracting the offset to or from a minimum value of the pixel values in the patch, is less than a minimum value among pixel values expressible by the bit depth, the offset is adjusted to a difference value between a minimum value among the pixel values expressible by the bit depth and a minimum value of the pixel values in the patch.

The method for processing the immersive video according to the present disclosure, wherein a corrected pixel value in the patch is obtained by applying a modulo operation with a variable, which is obtained based on the bit depth, to a value that is obtained by adding or subtracting an offset to or from a pixel value in the patch.

The method for processing the immersive video according to the present disclosure, further comprising encoding offset information for the patch as metadata.

The features briefly summarized above with respect to the present disclosure are merely exemplary aspects of the detailed description below of the present disclosure, and do not limit the scope of the present disclosure.

According to the present disclosure, immersive video processing/reconstruction quality may be improved by correcting uniformly a distribution of pixel values in an atlas.

According to the present disclosure, immersive video processing/reconstruction quality may be improved by providing a method for encoding/decoding information on correction of pixel values by using metadata.

It will be appreciated by persons skilled in the art that that the effects that can be achieved through the present disclosure are not limited to what has been particularly described hereinabove and other advantages of the present disclosure will be more clearly understood from the following detailed description.

DETAILED DESCRIPTION

Figure 1:
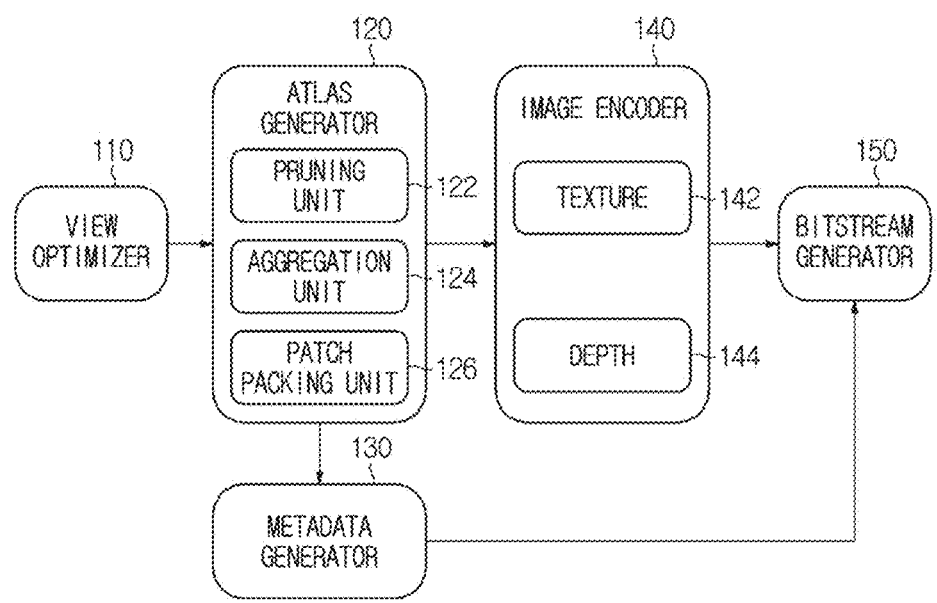
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present disclosure, references are made to the accompanying drawings that show, by way of illustration, specific embodiments in which the disclosure may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present disclosure, if not departing from the essence of the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present disclosure or the scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present disclosure. The same constituent elements in the drawings are denoted by the same reference numerals, and a repeated description of the same elements will be omitted.

An immersive video means an image whose viewport may be dynamically changed when a user's viewing position is changed. In order to implement an immersive video, a plurality of input images is required. Each of the plurality of input images may be referred to as a source image or a view image.

The immersive video may be classified as three degrees of freedom (3DoF), 3DoF+, Windowed-6DoF or 6DoF type. A 3DoF based immersive video may be implemented using only a texture image. In contrast, in order to render an immersive video including depth information, such as 3DoF+ or 6DoF, not only a texture image but also a depth image is required.

Assume that embodiments described below are for immersive video processing including depth information, such as 3DoF+ and/or 6DoF. In addition, assume that a view image is composed of a texture image and a depth image.

FIG. 1 is a block diagram of an immersive video processing apparatus according to an embodiment of the present disclosure.

Referring to FIG. 1, the immersive video processing apparatus according to the present disclosure may include a view optimizer 110, an atlas generator 120, a metadata generator 130, an image encoder 140 and a bitstream generator 150.

The view optimizer 110 classifies view images into a basic image and an additional image. The basic image indicates a view image with highest pruning priority, which is not pruned, and the additional image indicates a view image with lower pruning priority than the basic image.

The view optimizer 110 may determine at least one of the view images as a basic image. View images which are not selected as the basic image may be classified as additional images.

The view optimizer 110 may determine the basic image in consideration of a view position of the view image. For example, a view image whose view position is a center among the plurality of view images may be selected as a basic image.

Alternatively, the view optimizer 110 may select a basic image based on a camera parameter. Specifically, the view optimizer 110 may select a basic image based on at least one of a camera index, camera priority, a camera position or whether a camera is in a region of interest.

For example, at least one of a view image with a smallest camera index, a view image with a largest camera index, a view image with a camera index equal to a predefined value, a view image captured through a camera with highest priority, a view image captured by a camera with lowest priority, a view image captured through a camera at a predefined position (e.g., a center) or a view captured by a camera in a region of interest may be determined as a basic view image.

Alternatively, the view optimizer 110 may determine the basic image based on quality of the view images. For example, a view image with highest quality among the view images may be determined as a basic image.

Alternatively, the view optimizer 110 may determine a degree of data overlapping between the view images and then determine a basic image in consideration of an overlap data ratio with the other view images. For example, a view image with a highest overlap data ratio with the other view images or a view image with a lowest overlap data ratio with the other view images may be determined as a view image.

A plurality of view images may be set as a basic image.

The atlas generator 120 generates a pruning mask by performing pruning. In addition, a patch is extracted using the pruning mask and an atlas is generated by combining the basic image and/or the extracted patch.

The generated atlas may be composed of a texture atlas and a depth atlas. The texture atlas indicates an image in which a basic texture image and/or texture patches are combined, and the depth atlas indicates an image in which a basic depth image and/or depth patches are combined.

The atlas generator 120 may include a pruning unit 122, an aggregation unit 124 and a patch packing unit 126.

The pruning unit 122 performs pruning with respect to the additional image based on pruning priority. Specifically, pruning for the additional image may be performed using a reference image with higher pruning priority than the additional image.

The reference image includes a basic image. In addition, the reference image may further include another additional image according to the pruning priority of the additional image.

It may be selectively determined whether the additional information may be used as the reference image. For example, when the additional image is set not to be used as the reference image, only the basic image may be set as the reference image.

In contrast, when the additional image is set to be used as the reference image, the basic image and another additional image having higher pruning priority than the additional image may be set as the reference image.

Through the pruning process, overlapping data between the additional image and the reference image may be removed. Overlapping data detected from the additional image may be removed. As a result of performing pruning, a pruning mask that displays a non-overlapped region between the additional image and the reference image may be generated. The pruning mask may be binary data that displays data that does not overlap the reference image in the additional image. For example, on the pruning mask, a pixel determined as overlapping data may be marked as 0 and a pixel determined as non-overlapping data may be marked as 1.

Determination of overlapping data may be performed by comparing depth images. Specifically, the depth information at the corresponding positions of the additional depth image and the reference depth information is compared and, when a difference thereof is equal to or less than a threshold value, overlapping data between the additional depth image and the reference depth image at the corresponding position may be detected.

The non-overlapped region may have a shape other than a rectangular shape, but the patch is limited to a rectangular shape. Therefore, the patch may include not only a valid region but also an invalid region. Here, the valid region means a region composed of non-overlapping pixels between the additional image and the reference image. That is, the valid region represents a region including data which is included in the additional image but is not included in the reference image. The invalid region means a region composed of overlapping pixels between the additional image and the reference image. A pixel/data included in the valid region may be referred to as a valid pixel/valid data, and a pixel/data included in the invalid region may be referred to as an invalid pixel/invalid data.

The aggregation unit 124 extracts a patch using the pruning mask. Specifically, a rectangular region including valid data in the additional image may be extracted as a patch. Regardless of the shape of the valid region, a patch having a rectangular shape is extracted and the patch extracted from the valid region having a non-rectangular shape may include not only valid data but also invalid data.

The aggregation unit 124 may group at least one patch.

For an unpruned view image, an entire view image may be treated as a patch. Specifically, an entire 2D image in which the unpruned view image is deployed in a predetermined projection format may be set as a patch. The projection format may include at least one of an equirectangular projection format (ERP), a cube-map or a perspective projection format.

Here, the unpruned view image means a basic image with highest pruning priority. Alternatively, an additional image in which there is no overlapping data with the basic image and the reference image may be defined as an unpruned view image. Alternatively, regardless of whether there is overlapping data with the reference image, an additional image arbitrarily excluded from an object to be pruned may be defined as an unpruned view image. That is, even an additional image in which there is overlapping data with the reference image may be defined as an unpruned view image.

The packing unit 126 may pack each of grouped patches on a rectangular image. During packing, modification such as size change, rotation or flipping of the patch may be involved. An image packed with patches may be defined as an atlas.

Specifically, the packing unit 126 may generate a texture atlas by packing a basic texture image and/or texture patches and generate a depth atlas by packing a basic depth image and/or depth patches.

The entire basic image may be packed into an atlas image as a patch.

The number of atlases generated by the atlas generator 120 may be determined based on at least one of the arrangement structure of a camera rig, accuracy of a depth map or the number of view images.

The metadata generator 130 generates metadata for image production. The metadata may include at least one of camera related data, pruning related data, atlas related data or patch related data.

The pruning related data includes information for determining pruning priority of view images. For example, at least one of a flag indicating whether a view image is a root node or a flag indicating whether a view image is a leaf node may be encoded. The root node indicates a view image (i.e., a basic image) with highest pruning priority and the leaf node indicates a view image with lowest pruning priority.

When the view image is not a root node, a parent node index may be further encoded. The parent node index may represent the image index of a view image which is a parent node.

Alternatively, when the view image is not a leaf node, a child node index may be further encoded. The child node index may represent the image index of a view image which is a child node.

The atlas related data may include at least one of information on the number of atlases, information on priority of atlases, flag indicating whether an atlas includes a complete image or scaling related information of an atlas.

The patch related data includes information for specifying the position and/or size of a patch in an atlas image, a view image, to which a patch belongs, and the position and/or size of a patch in a view image. For example, at least one of position information indicating the position of the patch in the atlas image or size information indicating the size of the patch in the atlas image may be encoded. In addition, a source index for identifying a view image, from which a patch is derived, may be encoded. The source index represents the index of a view image which is an original source of a patch. In addition, position information indicating a position corresponding to a patch in a view image or size information indicating a size corresponding to a patch in a view image may be encoded.

The image encoder 140 encodes the atlas. The image encoder 140 may include a texture image encoder 142 for encoding a texture atlas and a depth image encoder 144 for encoding a depth atlas.

The bitstream generator 150 generates a bitstream based on the encoded image data and metadata. The generated bitstream may be transmitted to an immersive video output apparatus.

Figure 2:
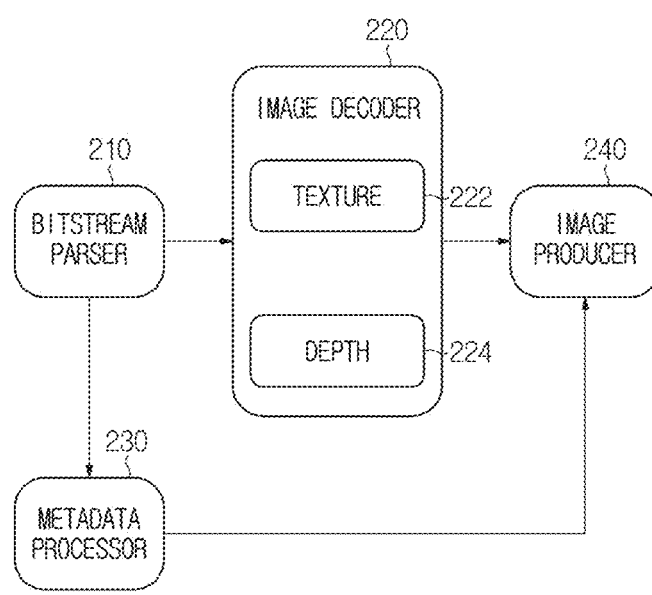
FIG. 2 is a block diagram of an immersive video output apparatus according to an embodiment of the present disclosure.

FIG. 2 is a block diagram of an immersive video output apparatus according to an embodiment of the present disclosure.

Referring to FIG. 2, the immersive video output apparatus according to the present disclosure may include a bitstream parser 210, an image decoder 220, a metadata processor 230 and an image producer 240.

The bitstream parser 210 parses image data and metadata from a bitstream. The image data may include data of an encoded atlas.

The image decoder 220 decodes the parsed image data. The image decoder 220 may include a texture image decoder 222 for decoding a texture atlas and a depth image decoder 224 for decoding a depth atlas.

The metadata processor 230 unformats the parsed metadata.

The unformatted metadata may be used to produce a particular view image. For example, when user's movement information is input to the immersive video output apparatus, the metadata processor 230 may determine an atlas necessary for image production, patches necessary for image production and/or the position/size of the patches in the atlas, in order to reproduce a viewport image according to user's movement.

The image producer 240 may dynamically produce the viewport image according to the user's movement. Specifically, the image producer 240 may extract patches necessary to produce the viewport image from the atlas, using information determined by the metadata processor 230 according to user's movement. Specifically, the viewport image may be produced by extracting an atlas including information on a view image necessary to produce the viewport image and patches extracted from the view image in the atlas and synthesizing the extracted patches.

Figure 3:
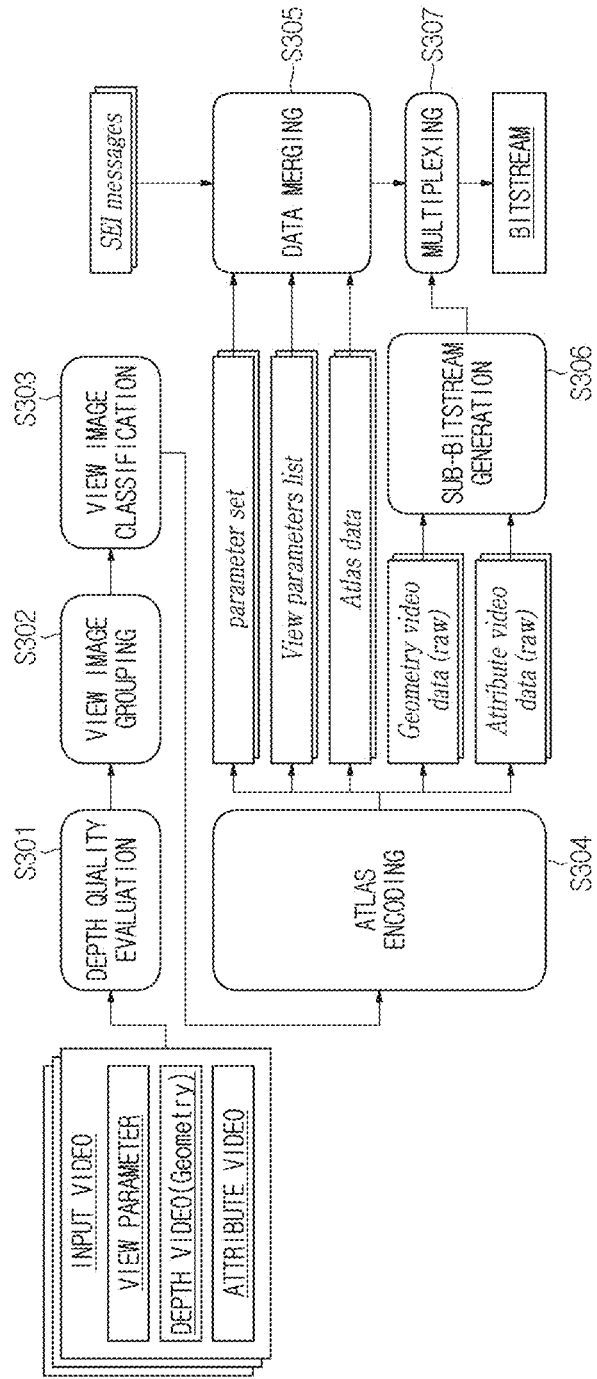
FIG. 3 is a flowchart illustrating an immersive video processing method.
Figure 5:
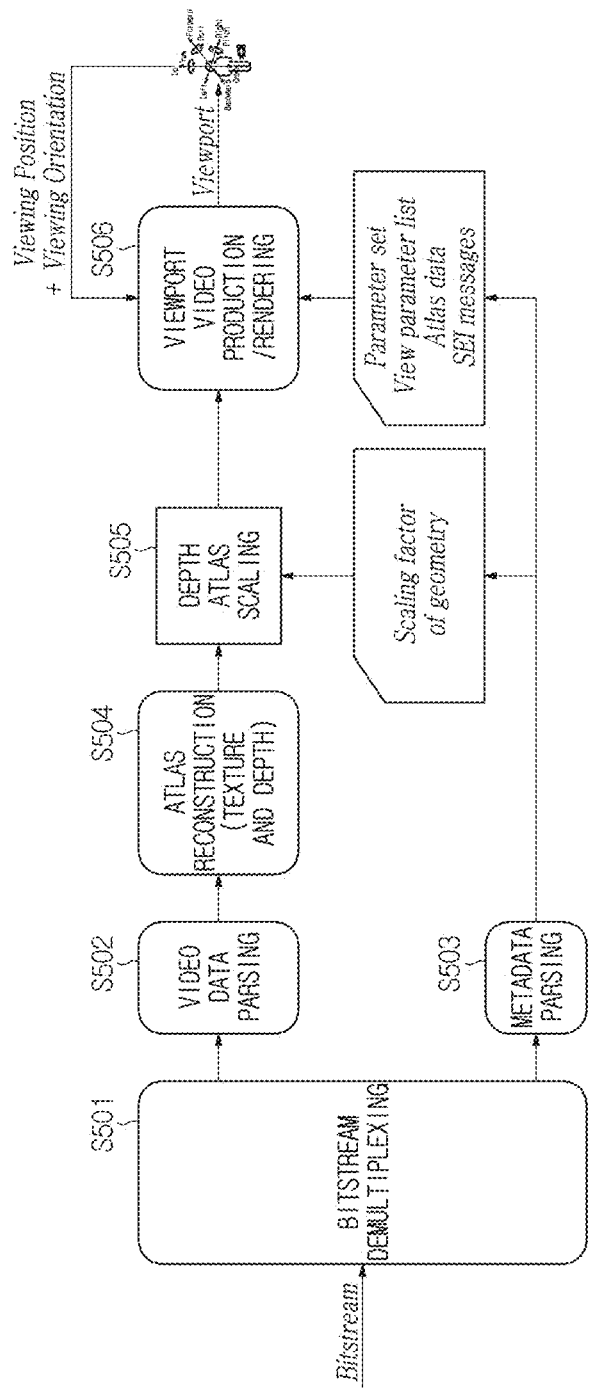
FIG. 5 is a flowchart illustrating an immersive video outputting method.

FIG. 3 and FIG. 5 illustrate flowcharts of an immersive video processing method and an immersive video outputting method respectively.

In the flowcharts below, italics or underlines indicate input or output data for implementing each step. Also, in the flowcharts below, arrows indicate the processing order of each step. Herein, when steps are not connected by arrows, it means that no temporal sequence is determined for the steps or the steps may be processed in parallel. It is also possible to process or output an immersive video in a different order from the orders described in the flowcharts below.

An immersive video processing apparatus may receive at least one input among a multiplicity of input images, an intrinsic camera variable and an extrinsic camera variable and evaluate depth map quality through input data (S301). Herein, an input image may consist of a pair of a texture image (attribute component) and a depth image (geometry component).

An immersive video processing apparatus may classify input images into a multiplicity of groups based on the positional proximity of a multiplicity of cameras (S302). By classifying input images into a multiplicity of groups, pruning and encoding may be performed with a relatively coherent depth value, while neighboring cameras are independent of each other. In addition, through the above process, a spatial random access service may become available in which rendering is performed using only information on a region that a user is viewing.

However, the above-described steps S301 and S302 are an optional process, not mandatory process that should be implemented.

When input images are classified into a multiplicity of groups, the processes described below may be performed independently for each group.

The immersive video processing apparatus may determine a priority order of pruning for view images (S303). Specifically, the view images may be classified into base images and additional images, and a priority order of pruning may be set among the additional images.

Figure 4:
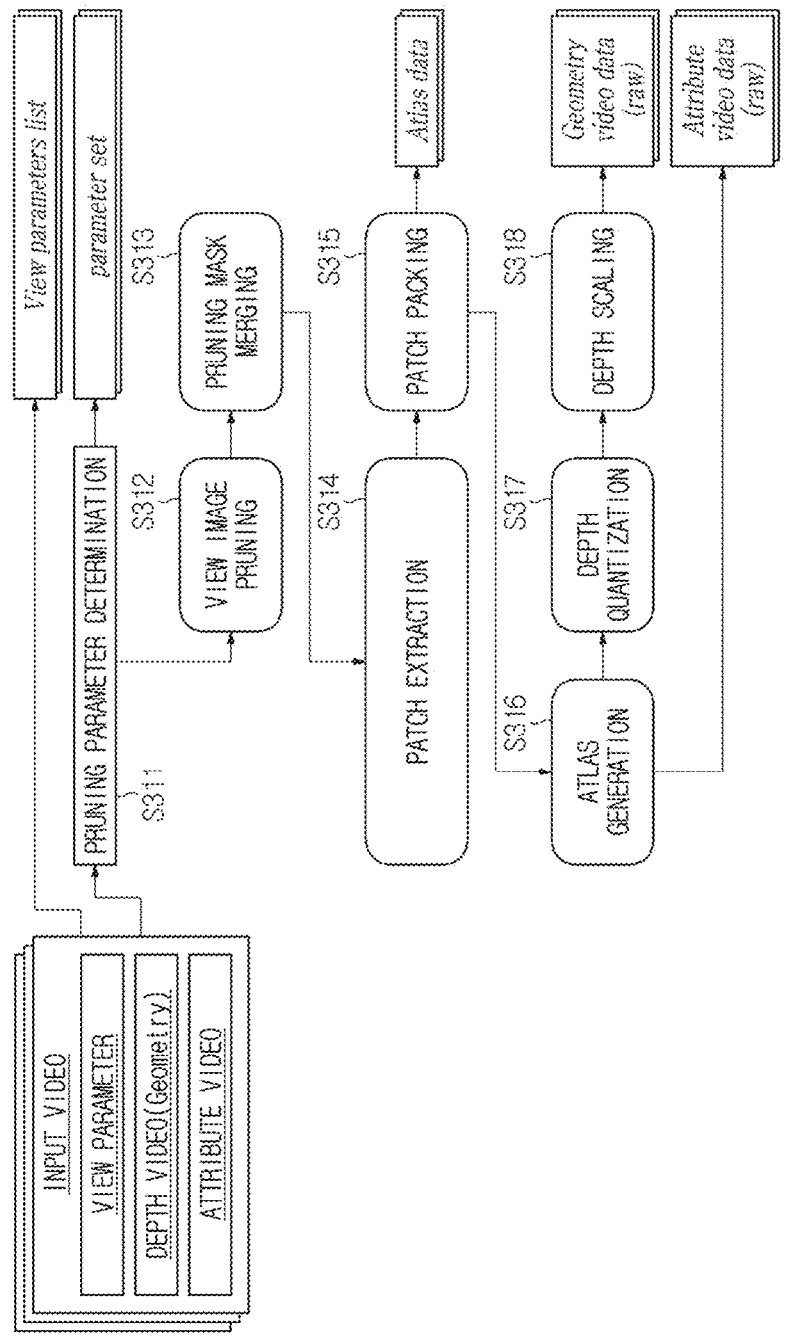
FIG. 4 is a flowchart illustrating an atlas encoding process.

Next, based on the priority order of pruning, an atlas may be generated, and the generated atlas may be encoded (S304). An encoding process of atlases is illustrated in detail in FIG. 4.

Specifically, a pruning parameter (e.g., a priority order of pruning) may be determined (S311), and based on the determined pruning parameter, pruning may be performed for the view images (S312). As a result of pruning, a base image with highest priority is maintained as it is. On the other hand, through pruning for the additional images, duplicate data between an additional image and a reference image are removed. Duplicate data between an additional image and a reference image may be removed through a warping process based on a depth image.

As a result of pruning, a pruning mask may be generated. When the pruning mask is generated, the pruning mask is combined every intra-period (S313). In addition, a patch may be extracted from a texture image and a depth image by using the combined pruning mask (S314). Specifically, the patch may be extracted by masking texture images and depth images with the combined pruning mask.

Herein, an unpruned view image (e.g., a base image) as a whole may be handled as one patch.

Next, the extracted patches may be packed (S315), and an atlas may be generated (S316). Specifically, a texture atlas and a depth atlas may be generated.

Also, the immersive video processing apparatus may determine a threshold value for determining the validity and invalidity of a pixel based on the depth atlas (S317). As an example, a pixel with a value in an atlas smaller than the threshold value may correspond to an invalid pixel, and a pixel with a value equal to or greater than the threshold value may correspond to a valid pixel. The threshold value may be determined in a unit of video or be determined in a unit of patch.

In order to reduce the amount of data, the size of a depth atlas may be reduced at a specific ratio (S318). When the size of a depth atlas is reduced, information on a reduction ratio of the depth atlas (e.g., scaling factor) may be encoded. In an immersive video outputting apparatus, a depth atlas, which is downscaled through a size of a texture atlas and a scaling factor, may be restored to its original size.

Metadata (e.g., a parameter set, a view parameter list or atlas data) generated by an atlas encoding process and supplemental enhancement information (SEI) are combined (S305). Also, a sub-bitstream may be generated by encoding a texture atlas and a depth atlas respectively (S306). Also, a single bitstream may be generated by multiplexing encoded metadata and an encoded atlas (S307).

An immersive video outputting apparatus demultiplexes a bitstream that is received from an immersive video processing apparatus (S501). As a result, video data, that is, atlas data and metadata may be extracted respectively (S502, S503).

Based on parsed video data, the immersive video outputting apparatus may restore an atlas (S504). Herein, when a depth atlas is downscaled at a specific ratio, the depth atlas may be scaled to its original size by obtaining relevant information from metadata (S505).

When a user movement occurs, an atlas required for synthesizing a viewport image according to the user's movement may be determined based on metadata, and patches included in the atlas may be extracted. A viewport image may be generated and rendered (S506). Herein, in order to synthesize the generated patches, size/position information of each patch and a camera parameter may be used.

Based on the foregoing description, a video processing method proposed by the present disclosure will be described in further detail.

Each patch in an atlas has its own pixel value, and thus each patch has a different distribution of pixel values. As each patch has a different distribution of pixel values, an edge is more likely to occur on a boundary between patches, which may cause the problem of reduced encoding/decoding efficiency.

To solve the problem, the present disclosure proposes a method of compensating a difference of pixel value distribution between patches. As an example, a distribution of pixel values may be moved so that patches may have a uniform distribution of pixel values.

Figure 6:
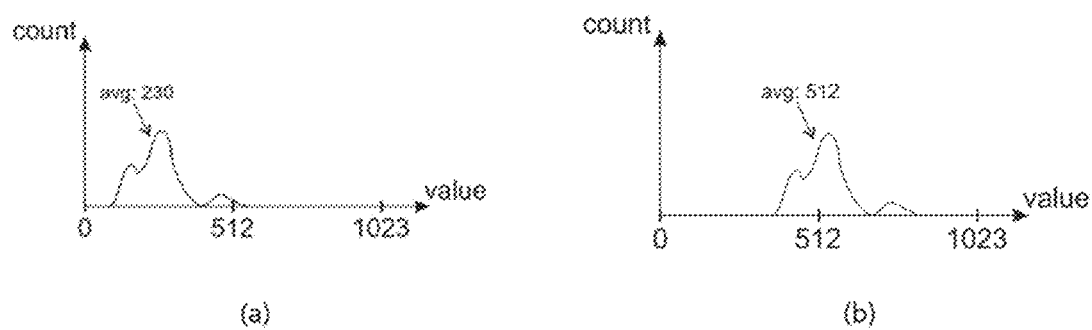
FIG. 6 and FIG. 7 show examples of corrected distributions of pixel values in patches.

FIG. 6 shows an exemplary corrected distribution of pixel values in patches.

Through correction of a distribution of pixel values, an average pixel value may be changed to a target value. Correction of a distribution of pixel values may induced by adding or subtracting an offset to or from each pixel value. The offset may be derived as a difference of pixel values between an average value and a corrected average value. Specifically, an offset may be derived by subtracting a corrected average value from an average value of pixel values or by subtracting an average value from a corrected average value of pixel values. In the embodiment described below, it is assumed that an offset is derived by subtracting an average value of pixel values from a corrected average value.

A corrected average value may be determined based on a bit depth. As an example, among values that are expressible by a bit depth, a median value (e.g., 2 (Bitdepth-1), 512 for 10-bit image) may be set as a corrected average value.

Alternatively, an average pixel value for multiple patches, which are packed in an atlas, may be set as a corrected average value. As an example, an average value of all the pixels in an atlas may be set as a corrected average value.

Alternatively, an average pixel value of patches, which are included in a predetermined area of an atlas, may be set as a corrected average value. Herein, the predetermined area may be at least one of a time, a sub-picture, and a coding tree unit. In this case, a different corrected average value may be set for each area.

Alternatively, among patches that are packed in an atlas, an average pixel value of a patch or patches, which are derived from a predefined view image, may be set as a corrected average value. As an example, an average pixel value of patch(es) derived from a base image may be set as a corrected average value.

In this embodiment, it is assumed that a median value of pixels values expressible by a bit depth is set as a corrected average value.

(a) of FIG. 6 shows a histogram of a patch before a distribution of pixel values is changed, and (b) of FIG. 6 shows a histogram of the patch after the distribution of pixel values is changed.

An offset may be derived by obtaining a difference between a corrected average value and an average value of pixel values in a patch. As an example, in (a) of FIG. 6, an average value of pixel values in a patch is shown to be 230. Accordingly, an offset may be derived to be 282, which is the difference between the average pixel value of 230 and a median value of 512 for pixel values that may be expressed in a 10-bit image.

Then, a distribution of pixel values may be changed by adding the offset to each pixel value of the patch. Thus, as in the example shown in (b) of FIG. 6, a corrected distribution of pixel values may be obtained by moving the original distribution of pixel values 282 in the positive direction.

Although not shown in the figure, in case an average pixel value is greater than a corrected average value, a corrected distribution of pixel values may be obtained by moving an original distribution of pixel values in the negative direction.

Correction of a distribution of pixel values may be performed for every color component. As an example, in a YUV image, correction of a distribution of pixel values may be performed for a luma component (Y) and a chroma component (U and/or V) respectively. In this case, an offset may be derived independently in each color component. Alternatively, an offset of a chroma component may be set to be identical with an offset of a luma component.

Alternatively, correction of a distribution of pixel values may be performed only for a specific color component.

When correcting a distribution of pixel values, some pixel values may go beyond an expressible range. As an example, FIG. 7 shows such an example.

Figure 7:
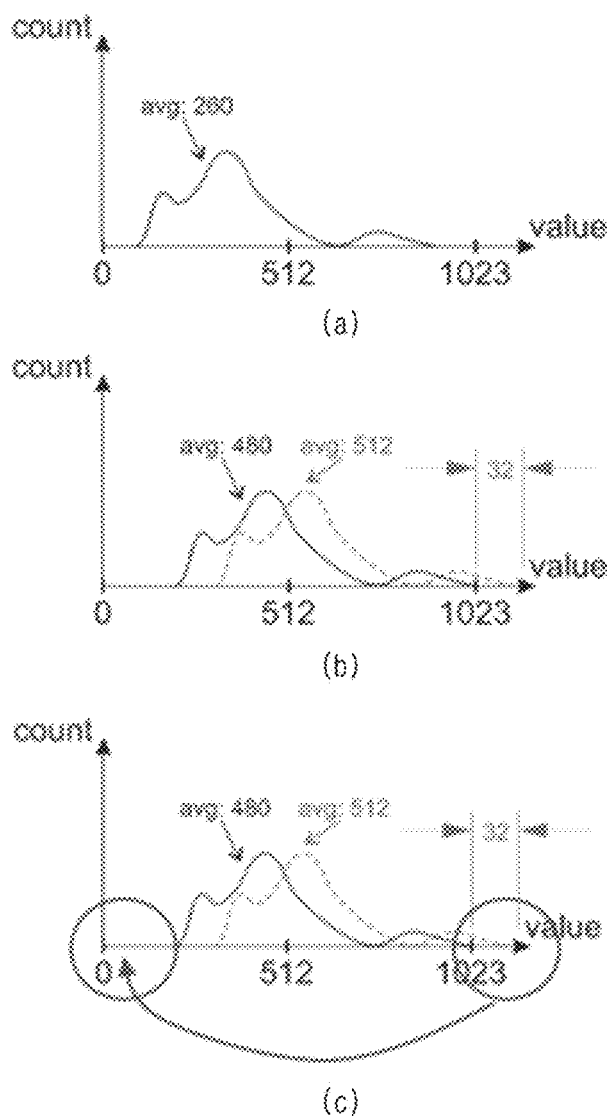

(a) of FIG. 7 shows a histogram of a patch before a distribution of pixel values is changed, and (b) of FIG. 7 shows a histogram of the patch after the distribution of pixel values is changed.

In (a) of FIG. 7, an average pixel value is shown to be 260. Accordingly, an offset may be derived to be 252 (median value of bit depths-512, average pixel value-260). Accordingly, correction of a distribution of pixel values may be performed to move an original distribution of pixel values 252 in the positive direction.

However, when moving a distribution of pixel values in the positive direction, as in the example shown by (b) of FIG. 7, a maximum value of a corrected distribution of pixel values may exceed a maximum value (1023) that may be expressible by a bit depth.

In order to solve the problem, in case an average pixel value is smaller than a median value of bit depths, an offset may be set to a minimum value among difference values between a median value of bit depths and an average pixel value and between a maximum value of bit depth and a maximum pixel value.

That is, when an offset is 252, if a corrected maximum pixel value exceeds a maximum value of bit depth by 32, the offset may be corrected to a value (that is, 220) which is obtained by subtracting 32 from the offset.

Although not shown in the figure, in case an average pixel value is larger than a median value of bit depths, an offset may be set to a maximum value among difference values between a median value of bit depths and an average pixel value and between a minimum value of bit depth and a minimum pixel value.

As another example, when an offset is set to a difference value between a median value of bit depths and an average pixel value, a distribution of pixels exceeding a maximum value of bit depth or pixels lower than a minimum value of bit depth may be changed again.

Specifically, in case an offset is a positive number, pixel values exceeding a maximum value of bit depth may be set to be distributed based on a minimum value of bit depth (that is, 0). Specifically, in case an offset is a positive number, corrected pixel values may be derived as in Equation 1 below.

$$P'(x,y)=(P(x,y)+\text{Offset})\%(2^{\text{Bitdepth}}) \quad \text{[Equation 1]}$$

In Equation 1, P(x, y) represents a pixel value before correction, and P'(x, y) represents a pixel value after correction. BitDepth represents a bit depth of an image.

Accordingly, in the example illustrated in (c) of FIG. 7, pixel values corrected between 1024 and 1055 may be corrected again to values between 0 and 32.

On the other hand, in case an offset is a negative number, the distribution of pixels values less than a minimum value of bit depth may be changed so that a maximum value of bit depth becomes an end point. Specifically, in case an offset is a negative number, corrected pixel values may be derived as in Equation 2 below.

$$P'(x,y)=(P(x,y)+\text{Offset})>=0?(P(x,y)+\text{Offset}):(P(x,y)+\text{Offset})+(2^{\text{BitDepth}})-1 \quad \text{[Equation 2]}$$

As another example, a clipping function may adjust pixel values, which exceed a maximum value of bit depth, to the maximum value of bit depth and pixel values, which are less than a minimum value of bit depth, to the minimum value of bit depth. As an example, corrected pixel values may be derived as in Equation 3 below.

$$P'(x,y)=\text{Clip3}(0,(P(x,y)+\text{Offset}),(2^{\text{Bitdepth}})-1) \quad \text{[Equation 3]}$$

Information associated with an offset may be encoded/decoded to metadata and thus be signaled. Specifically, for an atlas image, a flag indicating whether or not applying an offset to a patch is permitted may be encoded/decoded. In addition to or in place of the flag, a flag indicating whether or not an offset is applied to each patch may be encoded/decoded.

In case an offset is applied to a patch, at least one of information indicating the offset of the patch and information indicating an original average value of the patch may be encoded/decoded to metadata.

Table 1 and Table 2 show syntax structures including information associated with an offset.

TABLE 1

| | Descriptor |
|---|---|
| asps_miv_extension( ) { | |
|   asme_patch_attribute_offset_enabled_flag | u(1) |
|   if( asme_patch_attribute_offset_enabled_flag ) | |
|     asme_patch_attribute_offset_bit_depth_minus1 | ue(v) |
| } | |

In Table 1, the syntax asme_patch_attribute_offset_enabled_flag indicates whether or not a syntax structure includes information associated with an offset.

When the syntax asme_patch_attribute_offset_enabled_flag is 1, information on an offset may be additionally encoded/decoded.

As an example, first, when the syntax asme_patch_attribute_offset_flag is 1, the syntax asme_patch_attribute_offset_bit_depth_minus1 may be additionally encoded/decoded. The syntax asme_patch_attribute_offset_bit_depth_minus1 indicates a bit number of the syntax pdu_attribute_offset that indicates an offset of each patch. Specifically, the syntax asme_patch_attribute_offset_bit_depth_minus1 may have a value that is obtained by subtracting 1 from a bit number assigned to the syntax pdu_attribute_offset.

When a corrected average value is set to a median value of values that may be expressed by BitDepth, a maximum value of offset is incapable of exceeding $2^{(\text{Bitdepth}-1)}$. Accordingly, the syntax asme_patch_attribute_offset_bit_depth_minus1 may be set to one of 0 and (BitDepth-1).

TABLE 2

| | Descriptor |
|---|---|
| pdu_miv_extension( tileID, p ) { | |
|   if( asme_patch_attribute_offset_enabled_flag ) | |
|     for( c = 0; c < 3; c++ ) { | |
|       pdu_attribute_offset[ tileID ][ p ][ c ] | u(v) |
| } | |

When the syntax asme_patch_attribute_offset_enabled_flag is 1, information on an offset of each patch may be additionally encoded/decoded. As an example, the syntax pdu_attribute_offset[tileID][p][c] indicates an offset for a specific color component. Here, c represents an index of the color component. As an example, when c is 0, it may represent the luma component Y. When c is 1, it may represent the chroma component U. When c is 2, it may represent the chroma component V. In addition, tileID represents an identifier of a tile to which a patch belongs, and p represents an index assigned to a patch.

Alternatively, the syntax pdu_orig_mean [tileID][p][c] indicating an original average pixel value may be encoded/decoded. An immersive video outputting apparatus may derive an offset by subtracting an original average value, which is decoded as metadata, from an average pixel value of a decoded patch.

After decoding a patch, an immersive video outputting apparatus may restore a distribution of pixel values in a patch by adding or subtracting an offset to or from each pixel value in the patch. As an example, in an immersive video processing apparatus, when correction is performed by adding an offset to each pixel value, an immersive video outputting apparatus may perform correction of subtracting an offset from each decoded pixel value. Herein, when a pixel value derived by subtracting the offset is less than a minimum value expressible by a bit depth, an original pixel value may be restored according to Equation 2. On the other hand, in an immersive video processing apparatus, when correction is performed by subtracting an offset from each pixel value, an immersive video outputting apparatus may perform correction of adding an offset to each decoded pixel value. Herein, when a pixel value derived by adding the offset is greater than a maximum value expressible by a bit depth, an original pixel value may be restored according to Equation 1.

Table 3 exemplifies a process of restoring a distribution of pixel values in an atlas to an original distribution.

TABLE 3

Inputs to this process are:
- decAttrFrame[0][0][0][compIdx][y][x] with compIdx in 0 .. 2

TABLE 3-continued

- atlas parameters for all atlases
Output of this process are atlases with recovered color of patches.
for (a= 0; a <= vps_atlas_count_minus1; a++)
  for( y = 0; y < AspsFrameHeight[ a ]; y++ )
    for( x = 0; x < AspsFrameWidth[ a ]; x++) {
      bSz = AtlasPatchPackingBlockSize[a]
      p = BlockToPatchMap[y/bSz][x/bSz]
      decAttrFrame [a][y][x] = Clip(decAttrFrame[a][y][x] +
PduAttributeOffset [tileId][p][c], 0, 2^BitDepth − 1) for c = 0..2
    }

In Table 3, an immersive video outputting apparatus restores an original pixel value by adding an offset PduAttributeOffset to a decoded pixel value decAttrFrame.

Figure 8:
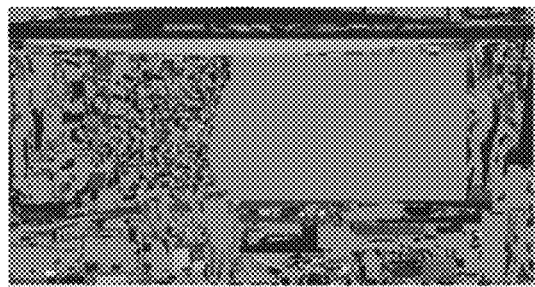
FIG. 8 and FIG. 9 compare distributions of pixel values in patches between before and after the distributions are changed respectively.
Figure 8:
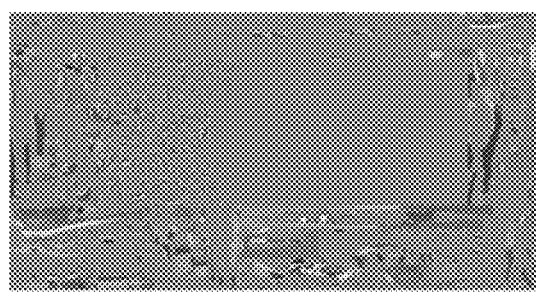
Figure 9:
Figure 9:
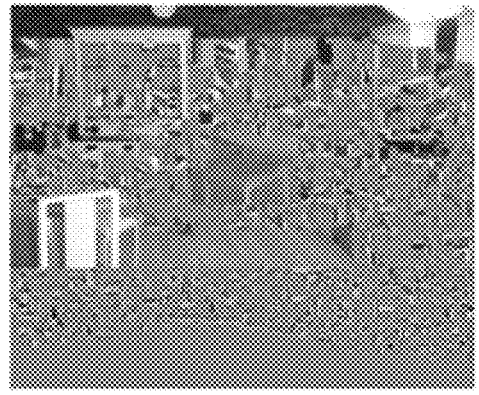

FIG. 8 and FIG. 9 compare distributions of pixel values in patches between before and after the distributions are changed respectively.

(a) of FIG. 8 and (a) of FIG. 9 show atlases before distributions of pixels are changed, and (b) of FIG. 8 and (b) of FIG. 9 show atlases after the distributions of pixels are changed.

Figure 10:
FIG. 10 is a view for comparing qualities of decoded images according to whether or not correction of a distribution of pixel values is applied.
Figure 10:

FIG. 10 is a view for comparing qualities of decoded images according to whether or not correction of a distribution of pixel values is applied.

(a) of FIG. 10 shows an image that is synthesized using an atlas in which a distribution of pixel values is not corrected, and (b) of FIG. 10 shows an image that is synthesized using an atlas in which a distribution of pixel values is corrected.

Table 4 and Table 5 show objective evaluations of images when a distribution of pixel values is corrected.

TABLE 4

| Mandatory content - Proposal vs. Low/High-bitrate Anchors | | | | | | | |
|---|---|---|---|---|---|---|---|
| Sequence | | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR |
| ClassroomVideo | SA | −0.4% | −1.2% | 1.96 | 4.0% | 1.2% | −0.3% | −0.7% |
| Museum | SB | 0.3% | 0.4% | 16.70 | 0.4% | 0.6% | 0.3% | 0.4% |
| Hijack | SC | −1.7% | −2.9% | 9.73 | −1.0% | −2.5% | −0.9% | −2.3% |
| Chess | SN | 0.6% | −0.3% | 16.62 | 0.6% | −0.1% | 0.3% | −0.4% |
| Kitchen | SJ | 0.8% | 1.1% | 16.85 | 1.2% | 1.3% | 0.9% | 1.4% |
| Painter | SD | −2.1% | −3.7% | 8.19 | −2.0% | −3.9% | −1.4% | −3.3% |
| Frog | SE | −1.0% | −1.2% | 5.98 | −0.7% | −1.1% | −0.5% | −0.7% |
| Carpark | SP | −0.3% | −0.6% | 7.51 | −0.0% | −0.2% | −0.0% | −0.3% |
| MIV | | −0.5% | −1.1% | 10.44 | 0.3% | −0.6% | −0.2% | −0.7% |

TABLE 5

| Optional content - Proposal vs. Low/High-bitrate Anchors | | | | | | | |
|---|---|---|---|---|---|---|---|
| Fencing | SL | −1.5% | −1.6% | 12.91 | −1.2% | −1.6% | −1.4% | −1.8% |
| Hall | ST | −0.7% | −1.4% | 12.94 | −0.2% | −1.0% | −0.4% | −1.0% |
| Street | SU | 0.4% | 0.3% | 10.56 | 0.6% | 0.1% | 0.4% | 0.2% |
| Group | SR | −0.7% | −1.2% | 11.86 | −0.4% | −1.0% | −0.4% | −0.8% |
| Fan | SO | −0.7% | −0.9% | 9.05 | −0.4% | −0.5% | 0.1% | 0.0% |
| MIV | | −0.7% | −1.0% | 11.46 | −0.3% | −0.8% | −0.3% | −0.7% |

Referring to Table 4 and Table 5, even when a distribution of pixel values is changed, the objective evaluation of an image does not seem to be significantly improved. However, as a distribution of pixel values is changed, an edge in an atlas is reduced and thus the subjective quality of a synthesized image may be improved (refer to the squares in FIG. 10).

Table 6 shows bitrate reductions with respect to a distribution of pixel values.

TABLE 6

| Test point | Bitrate reduction |
|---|---|
| QP1 | 0.82 % |
| QP2 | 1.49 % |
| QP3 | 3.46 % |
| QP4 | 7.59 % |
| QP5 | 13.35 % |

As exemplified in Table 6, when a distribution of pixel values is corrected, as a quantization parameter increases, a bitrate reduction may decrease more steeply.

The names of the syntax elements described in the above embodiments are temporarily given in order to describe the embodiments of the present disclosure. Different names from the ones suggested in the present disclosure may be given to syntax elements.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. A method for processing an immersive video, the method comprising:
performing pruning for view images;
generating a texture atlas by packing a patch extracted as a result of the pruning;
determining an offset for the patch in the texture atlas;
correcting pixel values in the patch by using the offset; and
encoding the patch with corrected pixel values,
wherein a correction of a pixel value in the patch is performed by subtracting the offset from the pixel value in the patch, and
wherein when a value obtained by subtracting the offset from the pixel value is less than a minimum value expressible by a bit-depth, the pixel value is corrected to the minimum value expressible by the bit-depth rather than the value obtained by subtracting the offset from the pixel value.

2. The method of claim 1, wherein the offset is derived as a difference value between a median value under the bit-depth, and an average value of the pixel values in the patch.

3. The method of claim 1, wherein, when a value, which obtained by subtracting the offset from the pixel value is greater than a maximum value expressible by the bit-depth, the pixel value is corrected to the maximum value expressible by the bit-depth rather than the value obtained by subtracting the offset from the pixel value.

4. The method of claim 1, further comprising encoding offset information for the patch as metadata,
wherein the offset information is encoded individually for each of color components, the color components comprising a luminance component and a chrominance component.

5. A method for synthesizing an immersive video, the method comprising:
decoding a texture atlas;
decoding metadata for the texture atlas;
extracting, by using the metadata, a patch from the texture atlas;
decoding an offset for the patch; and
correcting pixel values in the patch extracted from the texture atlas by using the decoded offset,
wherein a correction of a pixel value in the patch is performed by adding the offset to the pixel value in the patch, and
wherein when a value obtained by adding the offset to the pixel value is greater than a maximum value expressible by a bit-depth, the pixel value is corrected to the maximum value expressible by the bit-depth rather than the value obtained by adding the offset to the pixel value.

6. The method of claim 5, wherein the correction is performed only for the patch derived from the texture atlas, but not for a patch derived from a depth atlas.

7. The method of claim 6, wherein when a value resulting from adding the offset to the pixel value is less than a minimum value expressible by a bit-depth, the pixel value is corrected to the minimum value expressible by the bit-depth rather than the value derived by adding the offset to the pixel value.

8. The method of claim 5, wherein:
the offset is signaled as metadata for the patch, and
the offset is signaled individually for each of color components, the color components comprising a luminance component and a chrominance component.

* * * * *